US011495992B1

(12) United States Patent
Barron (10) Patent No.: US 11,495,992 B1
(45) Date of Patent: Nov. 8, 2022

(54) MODULAR POWER SUPPLY FOR NIGHT VISION DEVICES

(71) Applicant: Jesus Barron, Fountain, CO (US)

(72) Inventor: Jesus Barron, Fountain, CO (US)

( * ) Notice: Subject to any disclaimer, the term of this patent is extended or adjusted under 35 U.S.C. 154(b) by 0 days.

(21) Appl. No.: 17/732,197

(22) Filed: Apr. 28, 2022

Related U.S. Application Data

(60) Provisional application No. 63/182,907, filed on May 1, 2021.

(51) Int. Cl.
*H02J 7/35* (2006.01)
*H02J 7/00* (2006.01)
*A42B 3/04* (2006.01)
*H02S 40/38* (2014.01)
*H02S 10/40* (2014.01)

(52) U.S. Cl.
CPC .............. *H02J 7/35* (2013.01); *A42B 3/0406* (2013.01); *H02J 7/0068* (2013.01); *H02S 10/40* (2014.12); *H02S 40/38* (2014.12)

(58) Field of Classification Search
CPC ........... H02J 7/35; H02J 7/0068; H02S 10/40; H02S 40/38; A42B 3/0406
See application file for complete search history.

(56) References Cited

U.S. PATENT DOCUMENTS

| 8,009,229 B1 | 8/2011 | Peterson |
| 9,651,280 B2 | 5/2017 | Hill |
| 2019/0109349 A1 | 4/2019 | Thiel et al. |

OTHER PUBLICATIONS

Jeff Sisto, "Wearable Technology: Soldiers of the future will generate their own power," Army Technology Magazine, Nov./Dec. 2014, pp. 23-23.
Rebecca Merrett, "Wearable solar cells to replace heavy batteries for soldiers," CIO, Aug. 27, 2014, http://www2.cio.com.au/article/692861/cio50-2021-11-greg-emsley-maurice-blackburn/, downloaded Jul. 27, 2022.

*Primary Examiner* — Robert L Deberadinis
(74) *Attorney, Agent, or Firm* — Michael Downs; Downs IP Law LLC (57) ABSTRACT

A power pack and related components are provided for powering night vision devices and other electronic devices using solar panels. In one embodiment, a solar powered power pack with a rechargeable battery is mountable on a helmet or is otherwise attachable to wearable or portable gear.

18 Claims, 9 Drawing Sheets

FIG. 7 ical power. More specifically, the present disclosure provides systems, methods, and apparatus for using solar panels to convert solar energy into electrical energy to provide power powering devices such as night vision goggles mounted to a military helmet.

MODULAR POWER SUPPLY FOR NIGHT VISION DEVICES

CROSS-REFERENCE TO RELATED APPLICATIONS

The present application claims the benefit of priority of U.S. Provisional Patent Application No. 63/182,907 filed May 1, 2021, entitled "SOLAR NIGHT VISION POWER SUPPLY," which is hereby incorporated by reference in the present application.

FIELD OF THE INVENTION

The present invention relates to systems, methods, and apparatus for providing power for night vision devices and other electronic devices requiring electrical power. More specifically, the present disclosure provides systems, methods, and apparatus for using solar panels to convert solar energy into electrical energy to provide power powering devices such as night vision goggles mounted to a military helmet.

BACKGROUND

Soldiers serving in the military understand the importance of having all available resources when training or in a combat zone. Many soldiers are required to conduct operations at night in order to take advantage of the dark. Soldiers are trained to camouflage and to move quietly in the dark during military operations. Military helmets are often equipped with night vision goggles that can be mounted to a front of the military helmets. Current military helmets incorporate a battery pack that utilizes non-rechargeable AA alkaline or lithium batteries (1.5 volts) rated at 1800 milliamp hours (mAh) and placed in series to create a 6-volt power supply.

A major deficiency with this system is that these batteries are non-rechargeable and require a soldier to carry many spare batteries in order to have adequate power supply during training or real-world operations. However, once the power from the batteries is exhausted or there are no more batteries, the soldier no longer has night vision capabilities. This can be very dangerous for a soldier in combat or in operation mode who may get killed or captured because the soldier could not use night vision.

Accordingly, there is a great need for an improvement and alternative to the non-rechargeable batteries that soldiers currently rely on to power their night vision goggles.

BRIEF DESCRIPTION OF THE DRAWINGS

An understanding of embodiments described in this disclosure and many of the related advantages may be readily obtained by reference to the following detailed description when considered with the accompanying drawings. The drawings described herein are for illustrative purposes only of selected embodiments and not all possible implementations and are not intended to limit the scope of the present disclosure. With respect to the drawings.

DETAILED DESCRIPTION

In this specification, including the claims and the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "couple" as used herein may mean to connect or attach either directly or indirectly with intervening elements or components. The term "set" as used herein may refer to "one or more" items.

The present description is drawn to one or more non-limiting embodiments for a solar powered power pack capable of charging night vision goggles located on a military helmet and other electrical devices. The solar powered power pack, as described in one or more non-limiting embodiments, may advantageously fit on a military helmet and provide an alternative means for providing power to night vision goggles than the standard AA batteries currently used by soldiers in training and in combat or any other type of user, including police personnel and other security personnel. As noted above, the standard AA batteries are non-rechargeable and can be depleted quickly leaving a soldier without a vital resource of a working set of night vision goggles. The solar powered power pack, as described herein in one or more non-limiting embodiments uses an integrated set of solar panels that use a renewable resource, which is solar power to provide power to a rechargeable battery that is also included in the assembled solar powered power pack. The solar powered power pack should provide at least double the amount of milliamp hours (mAh) of charge to attached night vision goggles than currently provided via standard AA batteries. Further, another advantage is that the solar powered power pack is lightweight and easy to carry in or on a soldier's gear, clothing, backpack, or other wearable gear. Additional advantages and features are described below with respect to the drawings.

U.S. Provisional Patent Application No. 63/182,907 (the "'907 application") in FIG. 1 (incorporated herein by reference) shows a standard military helmet that is usually issued to soldiers. The helmet has a main body with a top, bottom, front side, and back or rear side. Soldiers usually are provided with night vision goggles, such as example night vision goggles 902 shown in FIG. 9 (incorporated herein by reference) of the '907 application, that provide night vision to soldiers at night or in the dark. Having night vision goggles is vital to soldiers in combat and in enemy territory in order to avoid capture and to fulfill military operations. Night vision goggles use thermal imaging technology to capture infrared light and allow the wearer to have an image of what is happening in the dark. Thermal imaging is based on the amount of heat being provided or made from objects and people. Night vision goggles may be particularly useful at revealing people moving around in the dark who are hidden by the darkness. Without a power source though, night vision goggles are useless.

Figure 3:
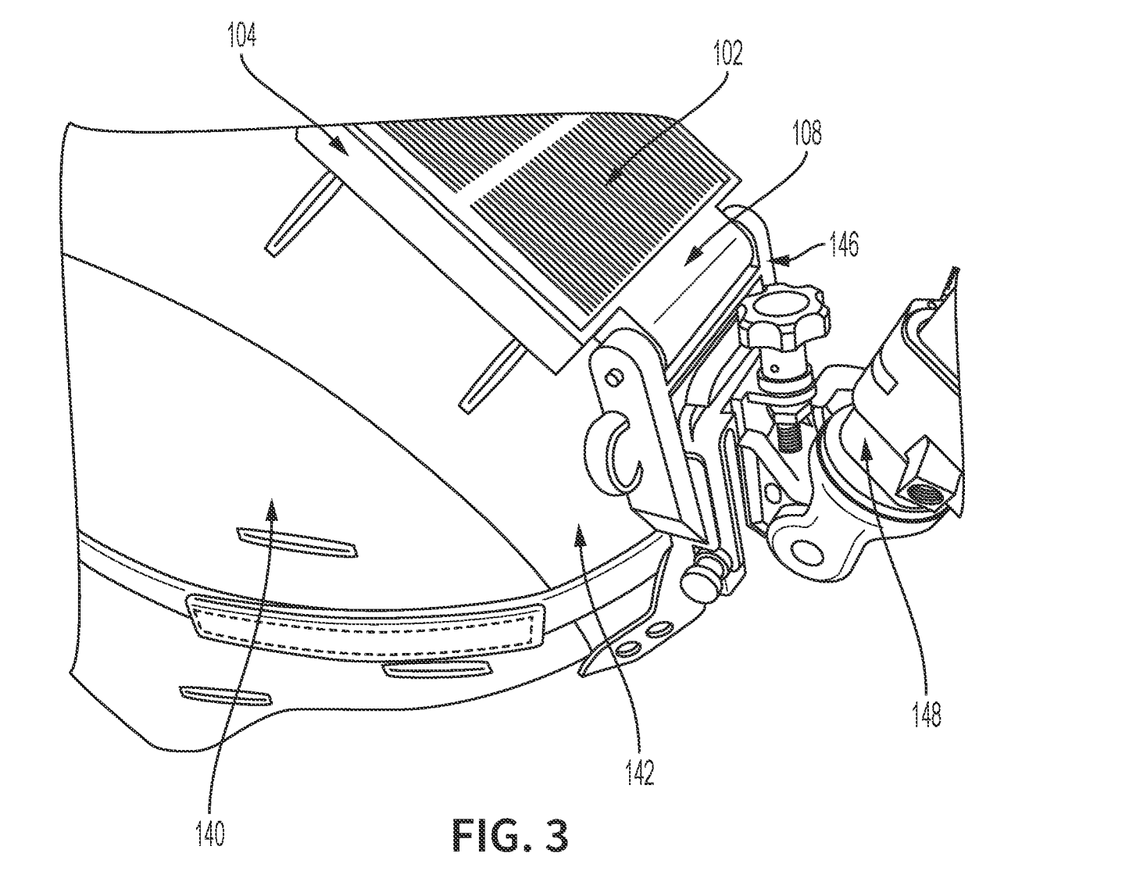
FIG. 3 is a pictorial illustration of a close-up view of an assembled solar powered power pack connected to a front mounted night vision mounting plate and arm on a military helmet.

Currently, military helmets typically include a rear mounted battery pack (see, e.g., 116 of FIG. 1 of the '907 application) that is attached to the backside portion of the military helmet. The rear mounted battery pack is usually removable and mounts to a designated, pre-existing connecting port on the rear of the military helmet. The rear mounted battery pack is meant to hold usually four standard double AA batteries (see, e.g., the standard AA batteries 302 shown in FIG. 3 of the '907 application, incorporated by reference in this application) and is used to provide power to the night vision goggles. The standard AA batteries typically are non-rechargeable and non-renewable. Soldiers are instructed to carry multiple standard AA batteries in case the set of AA batteries worn by the soldier to power the night vision goggles becomes depleted and dies out. Typically, the standard AA batteries have a limited amount of power that they offer and can provide. Standard AA batteries, as shown in FIG. 3 of the '907 application, may typically offer only about 1800 mAh of charge to the night vision goggles when placed in series to create a 6-volt power supply. In reality, this means that usually the night vision goggles can function for only about 1-2 hours, depending on how often the night vision goggles are powered on and off, before the standard AA batteries have to be replaced.

Figure 1A:
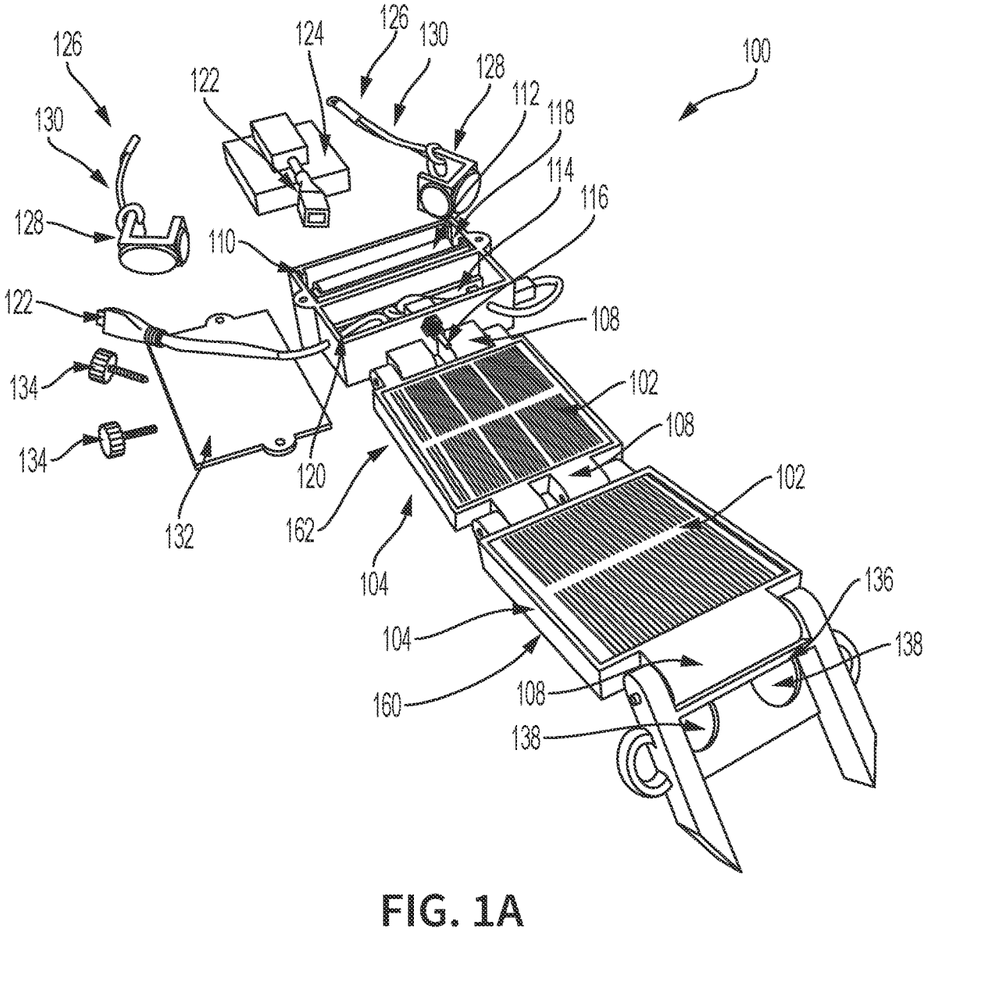
FIG. 1A is a pictorial illustration of a disassembled solar powered power pack and components.
Figure 1B:
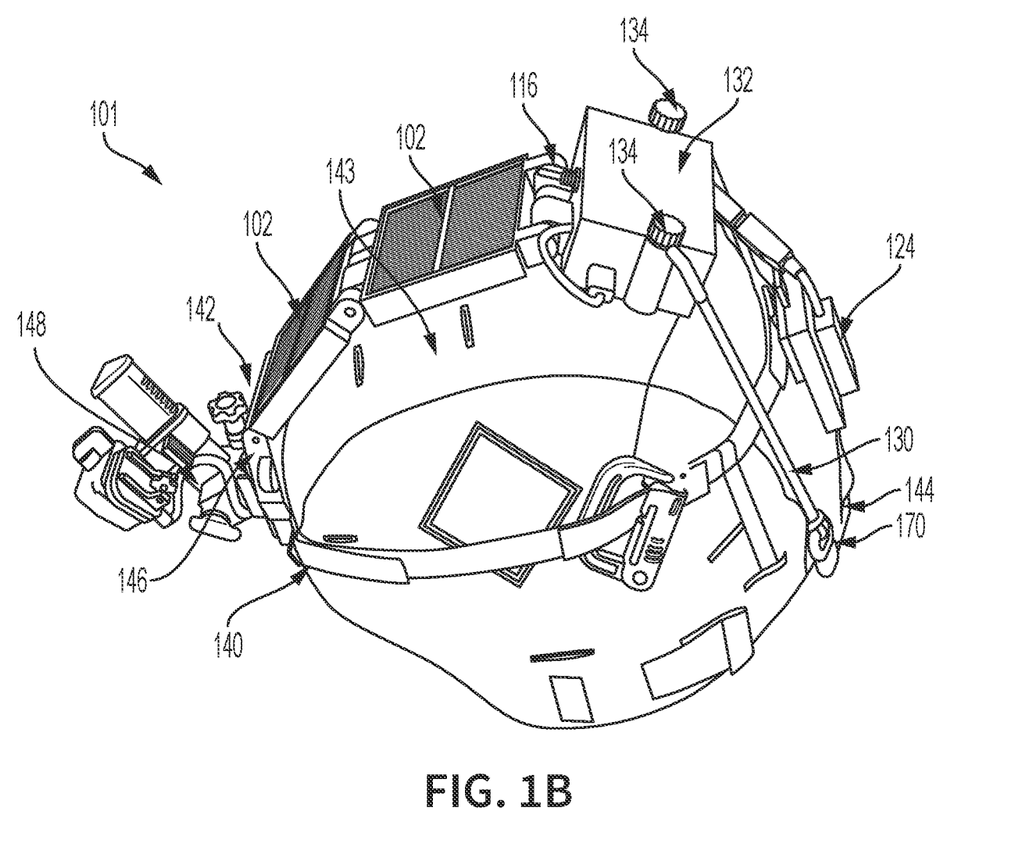
FIG. 1B is a pictorial illustration of an assembled solar powered power pack on a military helmet.
Figure 1C:
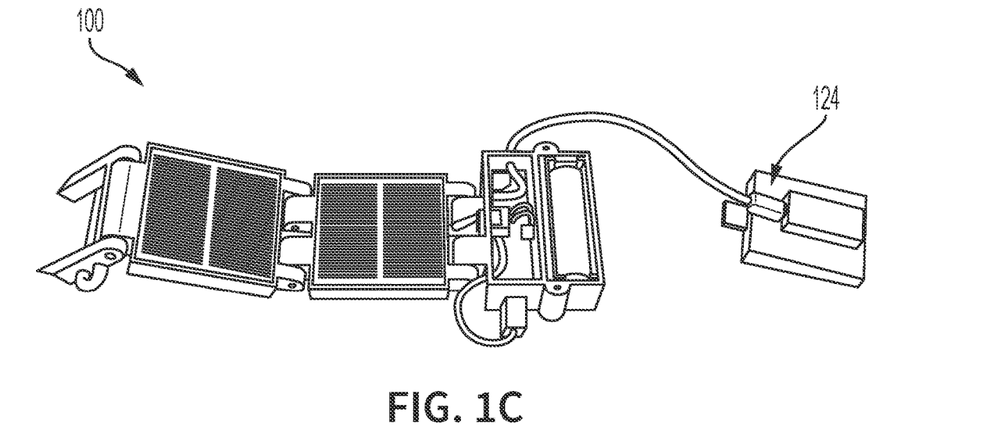
FIG. 1C is a pictorial illustration of assembled components of a solar powered power pack.
Figure 1D:
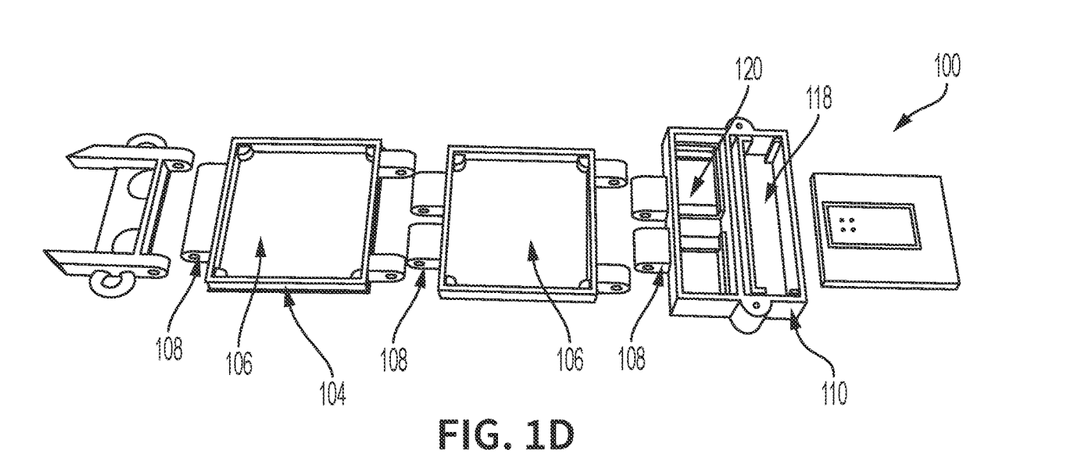
FIG. 1D is a pictorial illustration of dissembled components of a solar powered power pack.
Figure 2:
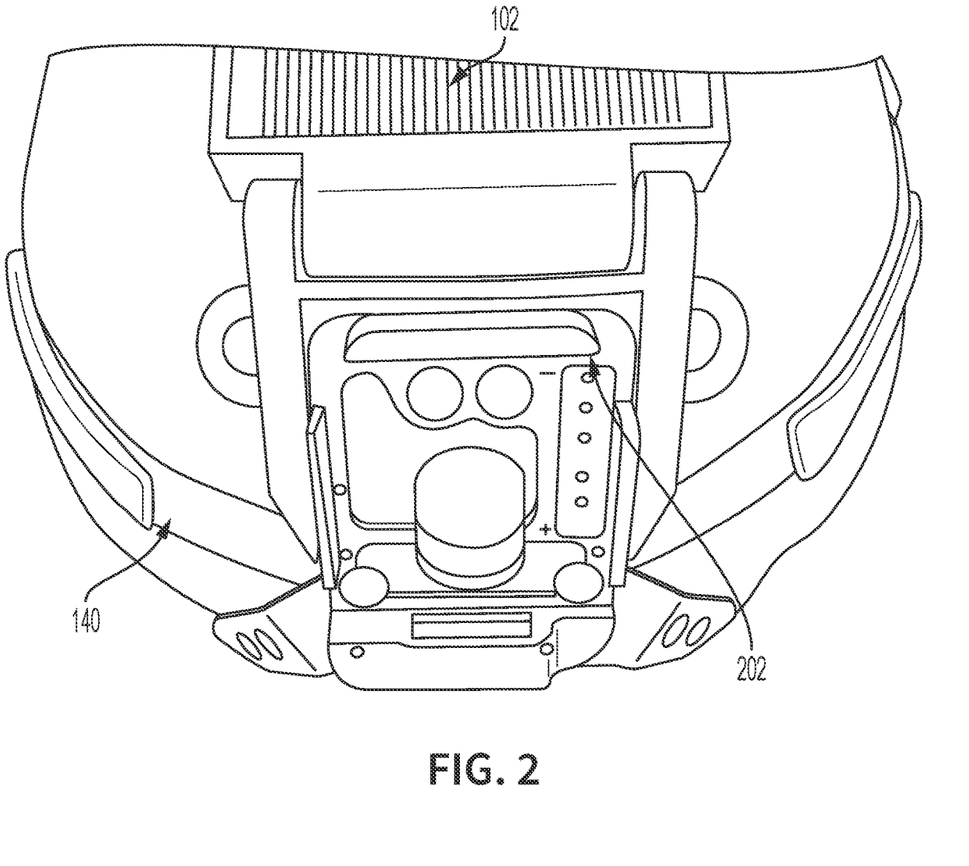
FIG. 2 is a pictorial illustration of another view of an assembled solar powered power pack connected to a frame of a front mounted mounting plate on a military helmet.

Further, military helmets currently typically include a front mounting plate configured to attach to a night vision goggle arm as shown in FIGS. 1-2 of the '907 application, incorporated herein by reference. The night vision goggles, such as those shown by reference 902 in FIG. 9 of the '907 application, attach or otherwise connect directly to the night vision goggles arm when a soldier wants to wear and carry the night vision goggles on the military helmet to provide night vision.

Accordingly, prior art systems are deficient because the power source relied on by soldiers and the military to charge night vision goggles are AA batteries whose electrical energy can be used up too quickly and are non-renewable and non-rechargeable. If the soldier is not carrying or runs out of AA batteries, then the soldier is not provided with any of the potentially life-saving benefits of the night vision goggles when needed most in training and in combat.

Figure 4:
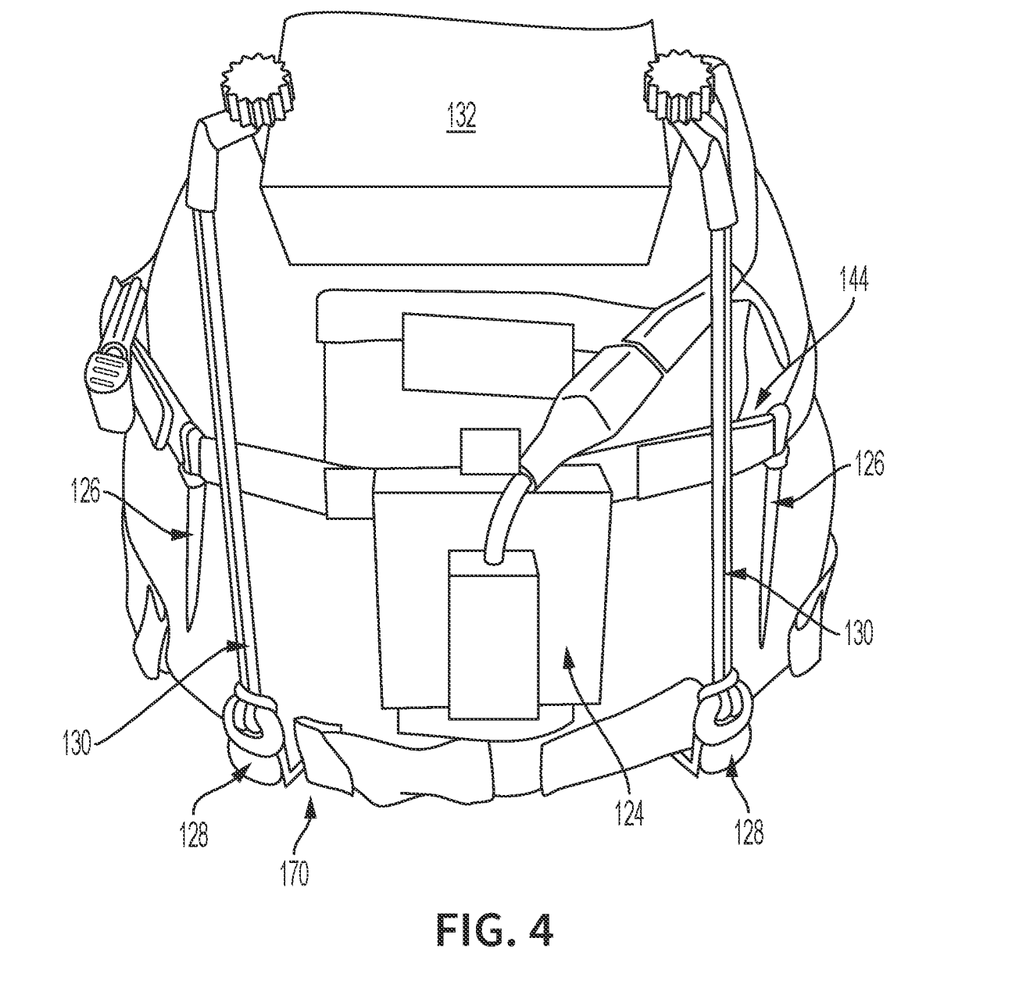
FIG. 4 is a pictorial illustration of an assembled solar powered power pack connected to a battery pack.

FIG. 4 of the '907 application (incorporated by reference herein) further provides a pictorial illustration for a new and assembled solar powered power pack 100 that provides an alternative and renewable source of energy to power night vision goggles when attached to a military helmet. The solar powered power pack may also be referred to herein as a solar night vision power supply in one or more non-limiting embodiments.

FIG. 1A of this specification provides a pictorial illustration of an example embodiment of a solar powered power pack 100 with various components disconnected from one another. FIGS. 1B, 1C, and 1D provide a close-up view of the assembled solar powered power pack 100 as worn on the military helmet 140 and also some other respective views of a disassembled solar powered power pack 100.

In a non-limiting embodiment, the solar powered power pack 100 includes one or more solar panels 102 as shown in FIGS. 1A-1D. The one or more solar panels 102 may be contained within solar panel plates 104, as shown in FIGS. 1A-1D. The solar panel plates 104 each include an internal cavity 106, as shown in FIG. 1D, to hold and house the solar panels 102. In one or more non-limiting embodiments, the solar panels 102 may include two or more solar panels of a desired power profile or combination of desired power profiles (e.g., two 5-volt 109 mAh solar panels) that may be wired in parallel as further explained below with respect to FIG. 5.

A solar panel in combination with any structure configured to contain or secure it may be referred to in this disclosure as a "solar panel device." For example, a solar panel plate 104 including a solar panel 106 are one example of a solar panel device.

As shown in FIGS. 1A-1D, each solar panel plate 104 may include one or more hinges 108 and be hingedly connected to a next component in the assembled solar powered power pack 100 in a non-limiting embodiment. Other methods of connecting each solar panel plate 104 may be used in alternative embodiments.

A first 160 solar panel 102 is shown in FIG. 1A positioned in a first solar panel plate 104 and a second 162 solar panel 102 is shown in FIG. 1A positioned in a second panel plate 104 whereby the first 160 solar panel 102 is positioned ahead of the second 162 solar panel 102.

The solar powered power pack 100 may further include a front mount anchor point 136 having one or more openings 138. The front mount anchor point 136 is used to couple or attach the solar powered power pack 100 to the frame 202 as shown in FIG. 2 of a front mounting plate 146 on a standard issue military helmet 140. The frame 202 is usually pre-existing on most military helmets 140 and/or may be integrated or otherwise attached to a military helmet 140, other type of headgear, and/or other types of wearable or portable gear (e.g., jackets, belts, pants, backpacks, bags, etc.).

As shown in FIGS. 2-3, the front mount anchor point 136 of the solar powered power pack 100 may connect around the sides of a frame 202 supporting the front mounting plate 146 (also shown in FIG. 1B) that is usually located or attached to a military helmet 140, with or without the night vision goggles arm 148.

In accordance with one embodiment, FIG. 3 shows the assembled solar powered power pack 100 coupled to the front mounting plate 146 having an attached night vision goggles arm 148.

As depicted in FIG. 1A, the solar powered power pack 100, in accordance with some embodiments, further includes a battery pack 110. The battery pack 110 of the solar powered power pack 100 preferably includes one or more rechargeable batteries 112. In one or more non-limiting embodiments, the rechargeable battery 112 may be or comprise at least one lithium-ion battery. Further, in one non-limiting embodiment, the lithium-ion rechargeable battery 112 may be a lithium-ion cell battery 112 (e.g., a 3.7-volt 18650 providing 2500 mAh of power when fully charged). Any one or more types of lithium-ion cell batteries may be used as deemed desirable for a particular implementation. The rechargeable battery 112 may be positioned within an internal cavity of a first compartment 118 of the battery pack 11o, depicted in FIGS. 1A and 1D.

Figure 5:
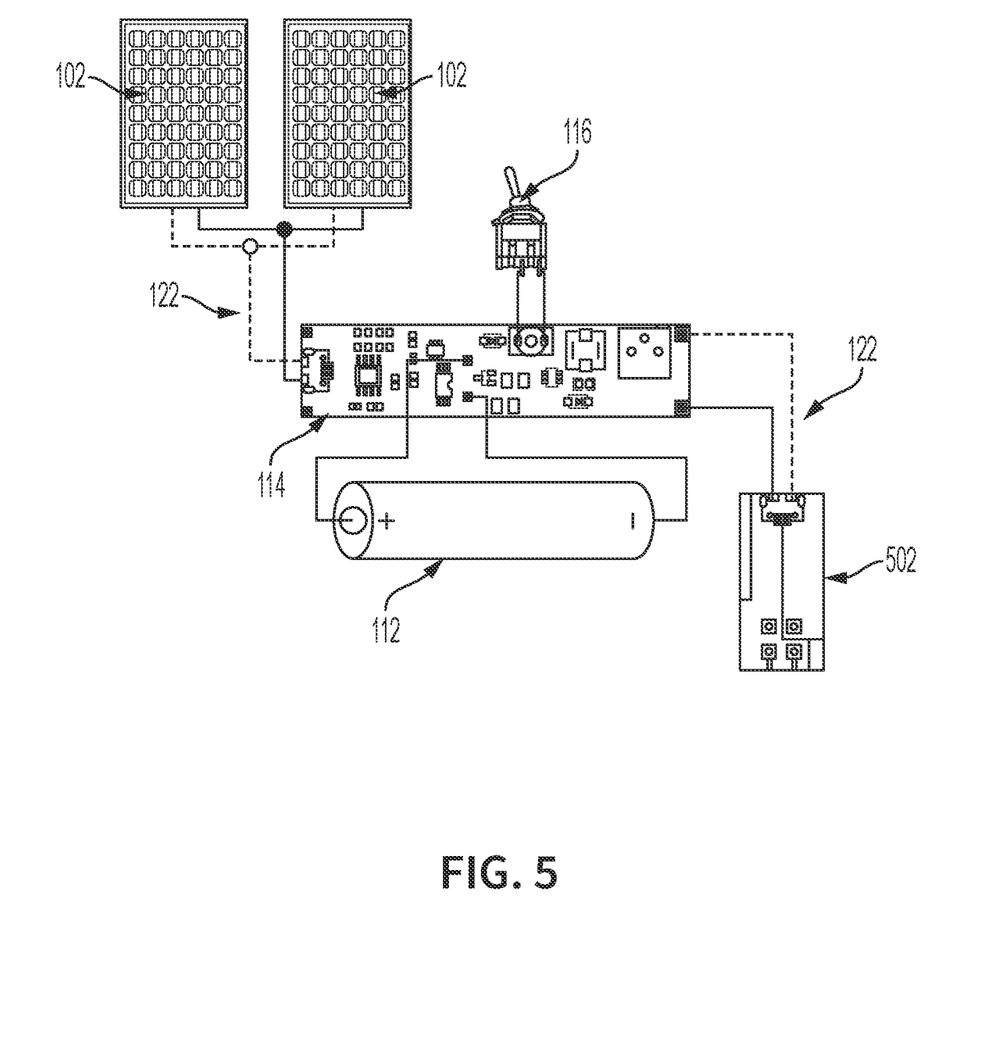
FIG. 5 is a schematic illustration of operation of some components of a solar powered power pack.

The battery pack 110 of the solar powered power pack 100 may further include a second compartment 120 configured for receiving and/or containing a battery pack circuit board 114, as shown in FIGS. 1A and 5. The circuit board 114 may be customized, in accordance with some embodiments, to include an integrated charger and/or a voltage booster. The voltage booster may be used to boost the amount of voltage provided by the one or more solar panels 102 to the at least one rechargeable battery 112 as further explained with reference to FIG. 5. In a non-limiting embodiment, a power switch 116 may be positioned on one side of the battery pack 110 to switch the power on and off to the voltage booster and for power distribution from the solar powered power pack 100.

The battery pack 110 may further comprise a cover plate 132 that can be used to cover the exposed interior compartments 118 and 120 of the battery pack 110 and the rechargeable battery 112 and circuit board 114. The cover plate 132 may be configured to be removably fastened over the top of the compartments 118 and 120 and their contents using one or more removable fasteners, such as the one or more screws 134, for example, shown in FIGS. 1A and 1B. The cover plate 132 preferably covers the rechargeable battery 112 and circuit board 114.

The battery pack no may further include cable 122 which connects to another cable 122 of the rear adapter plate 124. The battery pack no may include a port for cable 122 to connect the battery pack no to one or more other devices. For example, the port may be a micro USB type of port in a non-limiting embodiment, and the cable 122 may be a micro USB cable. As later discussed, and as shown in FIGS. 14-15 of the '907 application (incorporated by reference herein), a power cord and/or cable cord may be used to connect the battery pack no to a wall outlet and/or power bank to charge the rechargeable battery 112 in some instances.

The rear adapter plate 124 of the solar powered power pack 100 is configured to be directly mounted to the rear 144 of the military helmet 140 (e.g., as shown in FIG. 1B) and over the standard location of a typical battery pack used to house standard AA batteries (as shown by reference 116 in FIG. 1 and FIG. 3 of the '907 application, incorporated by reference herein). As discussed further below, in accordance with some embodiments, the rear adapter plate 124 may house one or more rear mounted circuit boards, as discussed in the '907 application with respect to its FIG. 12.

The solar powered power pack 100 may further include one or more rear anchors 126. Each rear anchor 126 includes an elastic band 130 and a hook portion 128. As shown in FIG. 1B, one end of the elastic band 130 for each rear anchor 126 is designed to hook over a top of the removable fastener 134. The hook portion 128 of the rear anchor 126 can be coupled or hooked to a lower edge 170, as shown in FIG. 1B, of the back 144 of a military helmet 140. To hold the solar powered power pack 100 in place against the back 144 of the military helmet 140 and on the whole military helmet 140, in one or more non-limiting embodiments, there may be two rear anchors 126 utilized to hold the solar powered power pack 100 in place during use and hooked over a lower edge 170 of the military helmet 140 along the back 144 of the military helmet 140.

FIG. 4 shows a closer view of the rear anchors 126 connected to lower edge 170 of the military helmet 140 and the rear adapter plate 124 positioned over the same battery pack helmet mount that would be located on a military helmet 140 and is configured to be connected to a standard battery pack holding standard AA batteries (as shown respectively by references 116 in FIGS. 1 and 302 in FIG. 3 of the '907 application, incorporated by reference herein). An advantage of the solar powered power pack 100 of the present disclosure is that it has a modern plug and play feature, allowing for modular reconfiguration.

As shown in FIG. 1B, when the solar powered power pack 100 is fully assembled and all its components connected together, the solar powered power pack 100 may be removably mounted to the back 144, top 143, and front 142 of the military helmet 140. The solar powered power pack 100 can be temporarily positioned on the military helmet 140.

The solar powered power pack 100 may be positioned so that the solar panels 102 (located in their solar panel plates 104) are positioned near the front 142 and the top 143 of the military helmet 140. When assembled, the front mount anchor point 138 is connected to a first solar panel 102 positioned in a solar panel plate 104. The first 160 solar panel 102 is then connected to a second 162 solar panel 102 positioned in a solar panel plate 104. The battery pack 110 having the power switch 116 is next connected to a back of the second 162 solar panel 102. When assembled, as shown in FIG. 1B, the cover plate 132 is positioned over the open compartments 118 and 120 (shown in FIG. 1D) of the battery pack 110 using one or more removable fasteners 134. Next, the battery pack 110 is connected via one or more cables 122 to one or more cables 122 of the rear adapter plate 124, which is held in place on the back 144 of the military helmet 140 with one or more rear anchors 126.

The solar powered panel pack 100 is configured and designed to be removable and may fit on a standard issue military helmet 140 by connecting to existing components of the military helmet 140, such as the frame 202 used to hold the mounting plate 146 and arm 148 for night vision goggles (and/or other helmet mountable or portable device requiring a power supply) and to the back 144 of the military helmet 140 via the rear anchors 126 which connect to an edge 170 along the back 144 of the military helmet 140. Further, as shown in FIG. 4, the rear adapter plate 124 may be configured to connect over an integrated pre-existing, connecting port or connecting mount of traditional battery packs on military helmet 140. By plugging the battery pack 144 to the rear adapter plate 124 (e.g., using cable 122), the power may be transferred to night vision goggles or other electronic device that may be mounted on or otherwise in proximity to the military helmet 140.

It is noted that any user may benefit from using the solar powered power pack 100 to provide power to night vision goggles and/or other electronic devices that may be mounted to a helmet 140 or to any other type of head gear or wearable gear. The solar powered power pack 100 may be used, for example, by soldiers, police officers, security personnel, rescue personnel, medical personnel, or any other user who wants to power his or her night vision goggles using the solar powered power pack 100.

There are many ways in which the solar panels 102 of the solar powered power pack 100 may be charged. The solar panels 102 are configured to transform sunlight into useable electric energy to assist in charging the rechargeable battery 112 of the solar powered power pack 100. The solar panels 102 may include, for example, many small photovoltaic cells that can convert sunlight into electricity. These cells are made of semi-conductive materials that can conduct electricity while maintaining the electrical imbalance needed to create an electric field. The solar panels 102 must thus be exposed to sunlight to convert solar power to useable electricity.

Accordingly, the wearer may attach the assembled solar powered power pack 100 to the military helmet 140, as shown in FIG. 1B, and ensure to wear the solar powered power pack 100 on the military helmet 140 during the daylight hours so that the solar panels 102 gradually obtain enough sunlight during the day needed to generate electricity. In other embodiments, the soldier may not have to wear the solar powered power pack 100 on the soldier's military helmet 140, as long as the solar powered power pack 100 is exposed to the sunlight. Accordingly, a soldier or other individual using the solar powered power pack 100 can leave or position the solar powered power pack 100 on any surface (e.g., ground surface, table, etc.) with exposure to sunlight to provide a sufficient amount of sunlight for the solar panels 102. The generated electricity obtained from the solar panels 102 is directed to the rechargeable battery 112, as discussed in this disclosure, which can provide enough power for a certain period of time to power night vision goggles when the night vision goggles (e.g., as depicted in FIG. 9 of the '907 application, incorporated by reference herein) are attached to the military helmet 140 and powered on. Other methods to charge the rechargeable battery 112 of the solar powered power pack 100, such as by outlet charging and/or charging from another power or battery unit, are further discussed later below.

In accordance with some embodiments, as described with respect to FIG. 16 of the '907 application, non-rechargeable batteries may be used (e.g., in an emergency use situation by placing them in interior compartment 118) to power night vision goggles without needing to charge the rechargeable battery 112.

In a non-limiting embodiment, the solar powered power pack 100 can power a PSQ-20 and PSQ-20B type night vision goggles, an example of which is shown at reference 902 in FIG. 9 of the '907 application (incorporated by reference herein).

Battery pack 110 may further comprise one or more lights, such as a light that may shine red (and/or any desired color) when the solar powered power pack 100 is switched on and being charged and the rechargeable battery 112 is receiving electrical energy. The rechargeable battery 112 may be positioned, for example, in a first compartment 118 of the exposed battery pack 110 (i.e., without the attached cover plate 132) and the circuit board 114 of the battery pack no may be positioned in a second compartment 120 above the first compartment 118. A cable 122 may connects the battery pack no to the one or more solar panels 102, as shown in FIG. 1A-1C, to direct the converted solar energy from the solar panels 102 to the circuit board 114 of the battery pack no.

In accordance with some non-limiting embodiments, a customized circuit board 114 for the battery pack no and a customized circuit board (e.g., as shown by reference 1202 in FIG. 12 of the '907 application) for the rear adapter plate 124 may be included as part of the solar powered panel pack 100. Multiple embodiments of the solar powered power pack 100 may be provided.

FIG. 5 provides a schematic of how the solar powered power pack 100 may function and operate according to a non-limiting embodiment. It is known that 6 volts is the nominal operating voltage of some types of military night vision goggles. As noted above, the conventional systems for powering night vision goggles involves the use of a battery pack having at least four 1.5 AA batteries each connected in series to provide 6 volts of power to power night vision goggles.

As shown in the schematic of FIG. 5, the two solar panels 102 may be wired in parallel and connected via cables 122 to the customized circuit board 114 located in the battery pack no. The circuit board 114 includes an integrated charger capable of charging up to 4.2 volts. The integrated battery charger in the circuit board 114 is used to put energy into the rechargeable battery 112 by forcing an electric current through the rechargeable battery 112. The circuit board 114 further utilizes a voltage booster that regulates the voltage from the rechargeable battery 112 via a DC-to-DC voltage booster to achieve the volt output desired for a particular implementation (e.g., in a range of substantially 1 to 50 volts). As shown in FIG. 5, power is then routed to a rear adapter plate 124 having its own circuit board 1202. The rear adapter plate 124, as noted above, preferably fits into the pre-existing mount for the standard helmet-mounted AA battery pack. The circuit board 1202 in the rear adapter plate 124 may be responsible for power distribution. Accordingly, in a non-limiting embodiment, the solar panel cells 102 provide at least 4.2 volts to the circuit board charger and the voltage booster boosts the provided voltage to 6 volts, which as noted above is needed to power typical night vision goggles.

In a non-limiting embodiment, solar powered power pack 100 may utilize a 3.7-volt rechargeable battery 112 which may be rated at 2700 mAh. In other embodiments, other voltages may be utilized for rechargeable battery 112 as desired for a particular implementation.

When the solar panel cells 102 are fully charged and have been exposed for a sufficient period of time to sunlight, the night vision goggles may be provided with enough power to last between 4-6 hours. Accordingly, the solar powered power pack 100 should be capable of providing double the amount of charging time to the night vision goggles when compared with traditional/standard AA batteries, which have currently been known to provide only about 1.5-2 hours' worth of charge time to the night vision goggles. Advantageously, the solar powered power pack 100 may provide more time for the soldier or other wearer of the night vision goggles to use the night vision goggles before having to provide an alternative source of power or charging the solar powered power pack 100 again.

Alternative methods of charging the rechargeable battery 112 may be utilized if, for example, the solar panels 102 are depleted of electrical energy or do not have a sufficient amount of charge for any reason. In accordance with some embodiments, the solar powered power pack 100 can be charged using any standard outlet or outlet connecting device, such as a power cord. A power cable having the correct connection port may be connected, for instance, from the power cord to the battery pack 110 of the solar powered power pack 100 and the rechargeable battery 112 may be charged in this fashion. In one non-limiting embodiment, the port for the battery pack 110 may be a micro USB port.

In accordance with some embodiments, the solar powered power pack 100 may be charged using a power bank. The power bank may, for example, be connected with a cable or power cord to the connection port of the battery pack 110, and any electrical energy from the power bank may be supplied to the rechargeable battery 112 in this manner.

Accordingly, solar powered power pack 100 may be charged from a power source such as a wall outlet or connected outlet device or power bank in order to receive sufficient charge to power the night vision goggles for the full duration use time thus providing a consistent and alternative source of power.

As noted above, in some cases, the rechargeable battery 112 may be removed and non-rechargeable batteries may instead be inserted in place of the rechargeable battery 112. In emergency situations, if needed, non-rechargeable batteries (e.g., two C123A 3-volt batteries) may be inserted in place of one or more of the rechargeable batteries 112 and used to power night vision goggles and/or other types of electronic devices. This feature may be particularly helpful for soldiers in certain emergency situations. It is noted that the solar panel should be unplugged from the battery pack no in such a case.

Accordingly, solar powered panel pack 100 offers many advantages and benefits over the existing conventional AA battery packs currently used to power military grade night vision goggles. Notably, the solar powered panel pack 100 may be lightweight, weighing only 2.4 ounces more when assembled than the previous AA battery packs soldiers currently carry. Additionally, the solar powered panel pack 100 is more environmentally friendly and uses a rechargeable battery 112, rather than the disposable, non-renewable and non-rechargeable AA batteries currently used and promote green energy use. Further, the renewable source of energy for the solar powered power pack 100 may save consumers and taxpayers money rather than the cost needed to purchase disposable AA batteries.

Additionally, the solar powered power pack 100 can easily be carried by a soldier or other user in their backpack and/or gear and exposed to sunlight in multiple ways to receive charge via the solar panels. Further, the solar powered power pack 100 is versatile and adaptable in that alternative or additional sources of power may be used to power the rechargeable battery 112 of the battery pack 110 of the solar powered power pack 100. Advantageously, the solar powered power packs 100 better equip soldiers or other users who rely on their night vision goggles as part of their work or for any reason without fear that the night vision goggles will run out of power too quickly. The ability to trickle charge to the rechargeable lithium ion battery 112 during the day and to provide power to the night vision goggles is an enormous advantage and provides greater peace of mind to soldiers or other users that this tool may save the user's life.

Figure 6:
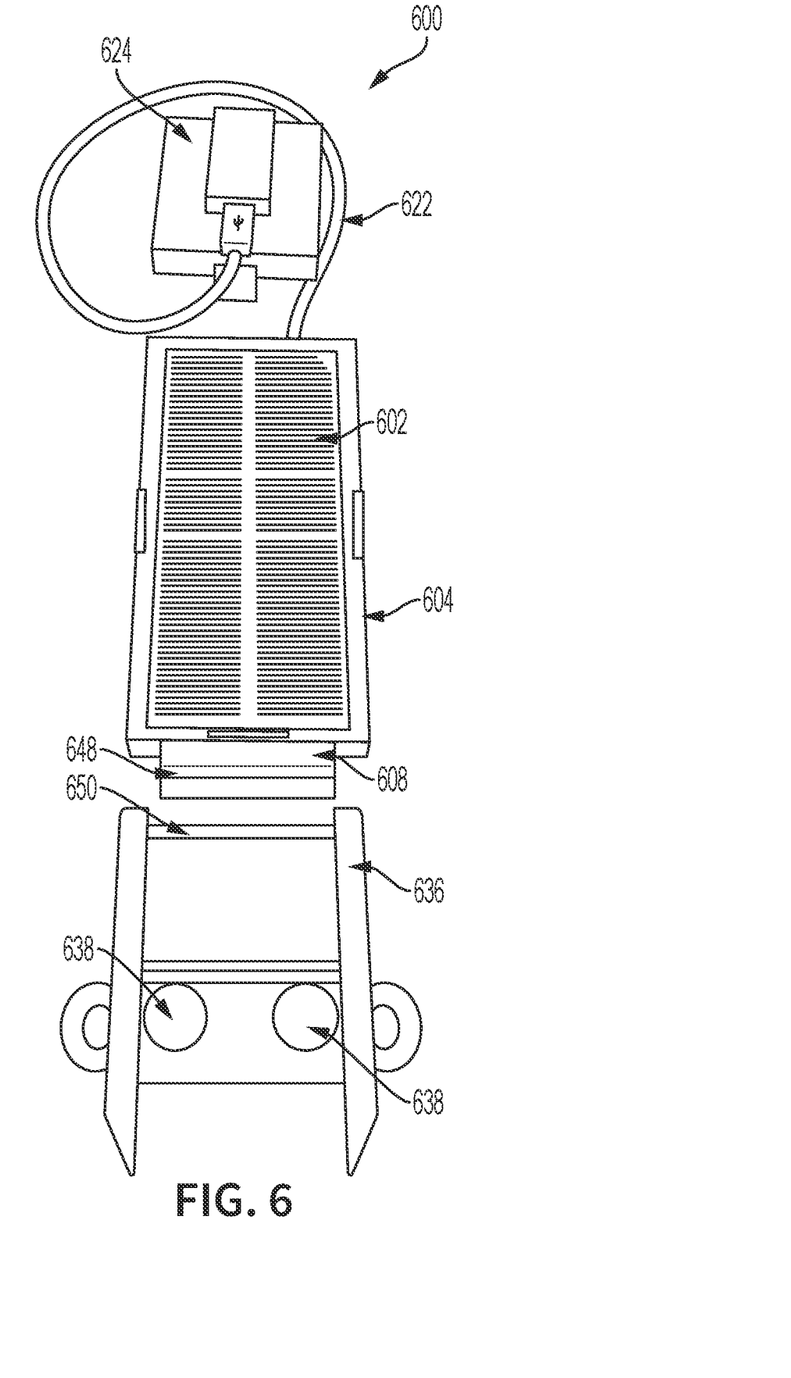
FIG. 6 is a pictorial illustration of a first alternative embodiment of a solar powered power pack and components.

FIG. 6 depicts an alternative, non-limiting embodiment of an example solar powered power pack 600 and components. The example solar powered power pack 600 includes a single solar panel 602 contained within a solar panel plate 604 configured to hold and house the solar panel 602 and also contain a battery pack with charger (not shown). Like the battery pack 110 of FIG. 1A, the battery pack of solar powered power pack 600 preferably includes one or more rechargeable batteries.

The battery pack of solar powered power pack 600 may further include or be connected to cable 622 which connects to the example rear adapter plate 624. The rear adapter plate 624 of the solar powered power pack 600 may be configured to be directly mounted to a military helmet or other type of wearable gear. In accordance with some embodiments, the rear adapter plate 624 may house one or more rear mounted circuit boards configured to output power to electronic devices as needed (e.g., to mounted night vision goggles).

As shown in FIG. 6, the solar panel plate 604 may include one or more connectors 608 comprising a notch 648 for coupling with corresponding anchor bar 650 for quick attachment and detachment of the solar panel plate 604 to and from the front mount 636 (e.g., for mounting to a military helmet). Other methods of connecting solar panel plate 604 may be used in alternative embodiments.

The solar powered power pack 600 may further include a front mount anchor point 636 having one or more openings 638. The front mount anchor point 636 may be used to couple or attach the solar powered power pack 100 to a frame 202, as shown in FIG. 2, of a front mounting plate 146 on a standard issue military helmet 140.

Figure 7:
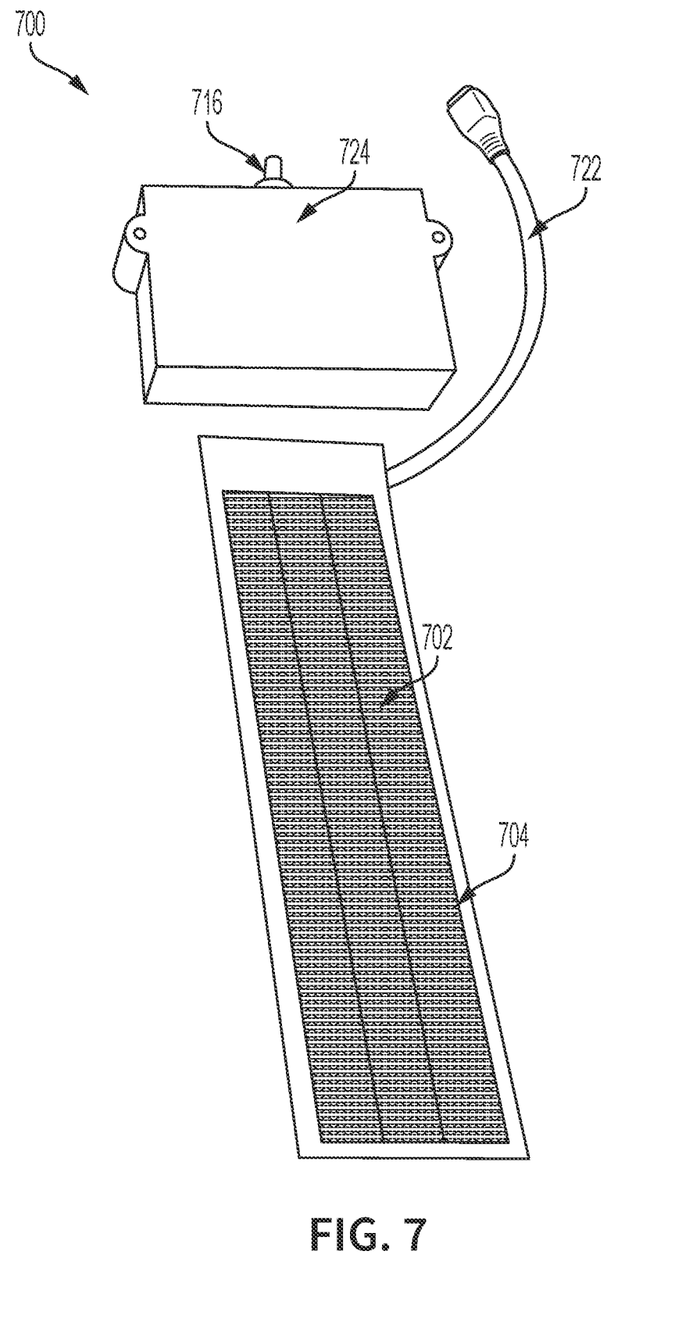
FIG. 7 is a pictorial illustration of a second alternative embodiment of a solar powered power pack and components.

FIG. 7 depicts an alternative, non-limiting embodiment of an example solar powered power pack 700 and components. The example solar powered power pack 700 includes a flexible solar panel 702 affixed to a solar panel plate 704. While only a single flexible solar panel 702 is depicted in FIG. 7, it will be readily understood that any number, shape, and combination of solar panels may be used as deemed desirable for a particular implementation.

The solar powered power pack 700 may further comprise a combination battery pack and power supply 724, providing combined functionality of the battery pack 110 of FIG. 1A and the rear adapter plate 124 as a power supply. The combination battery pack and power supply 724 preferably includes one or more rechargeable batteries. The solar powered power pack 700 may further include or be connected to cable 722 which connects to the example combination battery pack and power supply 724.

The combination battery pack and power supply 724 of the solar powered power pack 700 may be configured to be directly mounted to a military helmet or other type of wearable gear. In one embodiment, solar powered power pack 700 does not comprise a front mount.

In accordance with some embodiments, the combination battery pack and power supply 724 may house one or more rear mounted circuit boards configured to output power to electronic devices as needed (e.g., to mounted night vision goggles).

In a non-limiting embodiment, a power switch 716 may be positioned on one side of the combination battery pack and power supply 724 to switch the power on and off for power distribution from the solar powered power pack 100.

According to some embodiments, any power pack or components thereof may be configured with hook-and-loop fasteners for attaching to a user's gear (e.g., to a helmet or backpack).

According to some embodiments, a power back may comprise one or more of the following structural and/or functional features:
- Voltage regulation outputs for lower or higher voltage night vision systems
- EMF/RF shielding
- One or more connection adaptors to accommodate the inputs and outputs of various types of electronic devices (e.g., adaptors for variations in different night vision systems)
- Charge port variations as power connectors change, or as may be requested by users
- Rechargeable battery interchangeability (AAA, AA, lipo, lithium, etc.)
- One or more types of integrated light systems, such as but not limited to white LED, red LED, IR LED, strobe lights, and the like
- Wireless charging pads and/or related components for charging devices having batteries configured to charge wirelessly
- Waterproofing of some or all components
- Modular mounting options for attaching to various types of gear, equipment, and apparel
- Powering capability for other types of electronic devices (e.g., soldier equipment such as weapon sights, radios, GPS devices, etc.)

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

Any processes described in this disclosure do not necessarily imply a fixed order to any depicted actions, steps, and/or procedures, and embodiments may generally be performed in any order that is practicable unless otherwise and specifically noted.

Interpretation

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (as may be set forth at the beginning of the first page of this disclosure) nor the Abstract (as may be set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car, and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a user device.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:

1. A solar powered power pack configured to be mounted on a military helmet to power night vision goggles and other devices, the solar powered power pack comprising:
   one or more solar panels;
   one or more solar panel plates to hold the one or more solar panels;
   a battery pack connected to the one or more solar panel plates, the battery pack further comprising:
     a circuit board having an integrated voltage booster and charger, the circuit board positioned in a first compartment in the battery pack; and
     a rechargeable battery, the rechargeable battery positioned in a second compartment in the battery pack;

a rear mounted adapter plate, wherein the rear mounted adapter plate is configured to fit over a battery pack helmet mount already located on a rear position of a military helmet; and a rear mounted circuit board configured to distribute power, the rear mounted circuit board positioned within the rear mounted adapter plate, wherein the one or more solar panels are connected with cables to the battery pack for charging the rechargeable battery using solar energy in order to power the night vision goggles and other devices when the night vision goggles or other devices are attached to the military helmet.

2. A power pack configured to be mounted on wearable gear for powering at least one mounted electronic device, the power pack comprising:

at least one solar panel device;

a battery pack connected to the at least one solar panel device;

a power supply connected to the battery pack;

a first mount attachment for attaching the at least one solar panel to wearable gear; and a second mount attachment for attaching to the wearable gear at least one of (i) the battery pack and (ii) the power supply.

3. The power pack of claim 2, wherein the wearable gear comprises a helmet.

4. The power pack of claim 2, wherein the wearable gear comprises clothing.

5. The power pack of claim 2, wherein the first mount attachment comprises a mount anchor point connected to the at least one solar panel device and configured to attach the at least one solar panel device to a front portion of a helmet.

6. The power pack of claim 5, wherein the mount anchor point is connected by a hinge to the at least one solar panel device.

7. The power pack of claim 5, wherein the mount anchor point comprises an anchor bar, wherein the anchor bar is configured to be received by a corresponding notch on the at least one solar panel device for attaching the at least one solar panel device to the wearable gear.

8. The power pack of claim 5, wherein the wearable gear is a military helmet, and wherein the mount anchor point is configured to couple to a frame secured to the military helmet.

9. The power pack of claim 5, wherein the mount anchor point comprises an anchor bar, wherein the anchor bar is configured to couple with a corresponding notch of the at least one solar panel device for attaching the at least one solar panel device to the wearable gear.

10. The power pack of claim 2, wherein the first mount attachment comprises hook-and-loop fasteners for attaching the at least one solar panel device to the wearable gear.

11. The power pack of claim 2, wherein the second mount attachment comprises at least one elastic anchor for attaching the battery pack to the wearable gear.

12. The power pack of claim 2, wherein the second mount attachment comprises at least one elastic anchor for attaching the power supply to the wearable gear.

13. The power pack of claim 2, wherein the at least one solar panel device comprises a flexible solar panel.

14. The power pack of claim 2, wherein the at least one solar panel device comprises a solar panel and a corresponding solar panel plate.

15. The power pack of claim 2, wherein the battery pack comprises a circuit board having an integrated voltage booster and charger, the circuit board being positioned in a first compartment of the battery pack.

16. The power pack of claim 2, wherein the battery pack comprises a rechargeable battery, the rechargeable battery being positioned in a second compartment of the battery pack.

17. The power pack of claim 16, wherein the at least one solar panel device is connected with cables to the battery pack for charging the rechargeable battery using solar energy in order to power electronic devices.

18. The power pack of claim 2, further comprising:

a rear mounted adapter plate, wherein the rear mounted adapter plate is configured to fit over a battery pack helmet mount of a military helmet; and a rear mounted circuit board configured to distribute power, the rear mounted circuit board positioned within the rear mounted adapter plate.

* * * * *